(12) United States Patent
Masunaga et al.

(10) Patent No.: US 7,630,303 B2
(45) Date of Patent: Dec. 8, 2009

(54) COMMUNICATION CONTROL METHOD AND NETWORK SYSTEM

(75) Inventors: Shinya Masunaga, Tokyo (JP); Kuniyuki Manaka, Tokyo (JP); Yoshikatsu Niwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1030 days.

(21) Appl. No.: 10/266,473

(22) Filed: Oct. 8, 2002

(65) Prior Publication Data
US 2003/0067879 A1 Apr. 10, 2003

(30) Foreign Application Priority Data
Oct. 10, 2001 (JP) ............... P2001-313256

(51) Int. Cl.
H04L 1/00 (2006.01)
H04J 3/18 (2006.01)
G06F 15/16 (2006.01)

(52) U.S. Cl. ............... 370/229; 370/238; 370/252; 370/468; 709/229; 709/235

(58) Field of Classification Search ............... 370/252, 370/235, 254, 468, 351, 352, 389, 445, 446, 370/230, 231, 232, 233, 234
See application file for complete search history.

(56) References Cited

U.S. PATENT DOCUMENTS

| | | | |
|---|---|---|---|
| 5,777,984 A * | 7/1998 | Gun et al. | |
| 5,787,071 A * | 7/1998 | Basso et al. | 370/231 |
| 5,812,527 A * | 9/1998 | Kline et al. | |
| 5,909,443 A * | 6/1999 | Fichou et al. | |
| 5,936,940 A * | 8/1999 | Marin et al. | 370/232 |
| 5,946,297 A * | 8/1999 | Calvignac et al. | |
| 5,966,381 A * | 10/1999 | Buckley et al. | |
| 6,469,982 B1 * | 10/2002 | Henrion et al. | |
| 6,549,517 B1 * | 4/2003 | Aweya et al. | |
| 6,584,111 B1 * | 6/2003 | Aweya et al. | |
| 6,859,435 B1 * | 2/2005 | Lee et al. | |
| 6,957,269 B2 * | 10/2005 | Williams et al. | |
| 7,006,435 B1 * | 2/2006 | Davies et al. | |
| 7,072,295 B1 * | 7/2006 | Benson et al. | |
| 7,099,330 B2 * | 8/2006 | Chiussi et al. | |
| 7,382,727 B2 * | 6/2008 | Yang | 370/232 |
| 2002/0006111 A1 * | 1/2002 | Akita et al. | 370/235 |

(Continued)

FOREIGN PATENT DOCUMENTS

WO WO 0191406 * 11/2001

*Primary Examiner*—Steven HD Nguyen
(74) *Attorney, Agent, or Firm*—Frommer Lawrence Haug & LLP; William S. Frommer; Thomas F. Presson

(57) ABSTRACT

Disclosed herein are a communication control method and a network system. When a total band of a priority flow and a best-effort flow in any one of switches SW1 and SW2 and hosts H1 to H3 connected to a network exceeds a predetermined value, priority control is executed to make the priority flow take precedence of the best-effort flow and flow control is executed to limit the band of the best-effort flow. Thus, priority data such as sounds and moving pictures can be transmitted in a high-quality and reliable transmission without turbulence. As a result, it is possible to provide a communication control method and a network system offering high-quality communications even if transmitted data includes sounds and/or moving pictures.

2 Claims, 9 Drawing Sheets

U.S. PATENT DOCUMENTS

2002/0064149 A1* 5/2002 Elliott et al. ............... 370/352
2002/0091663 A1* 7/2002 Mikami et al. ................ 707/1
2003/0016626 A1* 1/2003 Lagerberg et al. ........ 370/230.1
2003/0016628 A1* 1/2003 Kadambi et al. ............ 370/235

* cited by examiner

F I G. 6
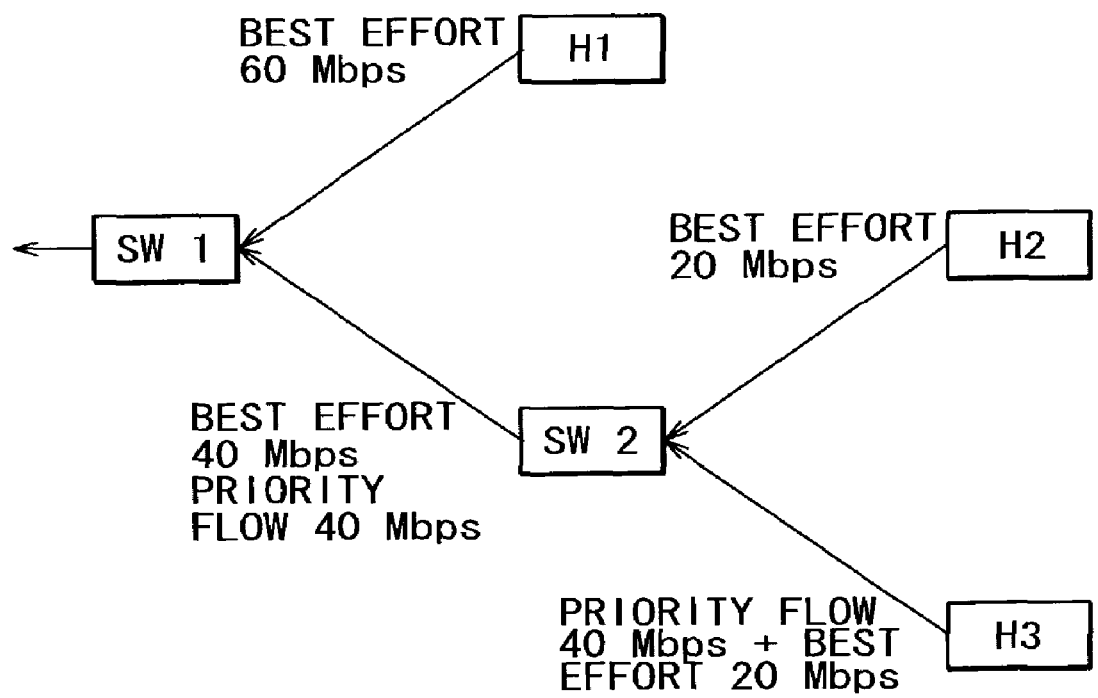

F I G. 1 0
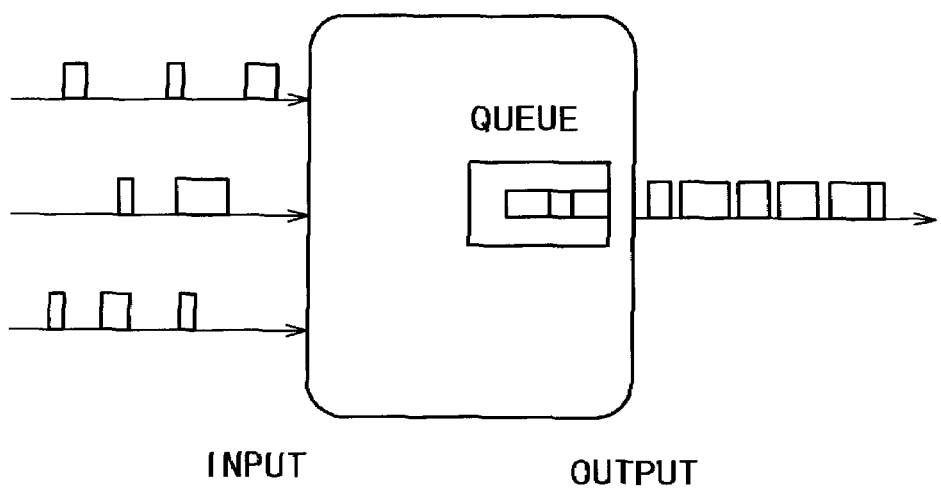
F I G. 1 1
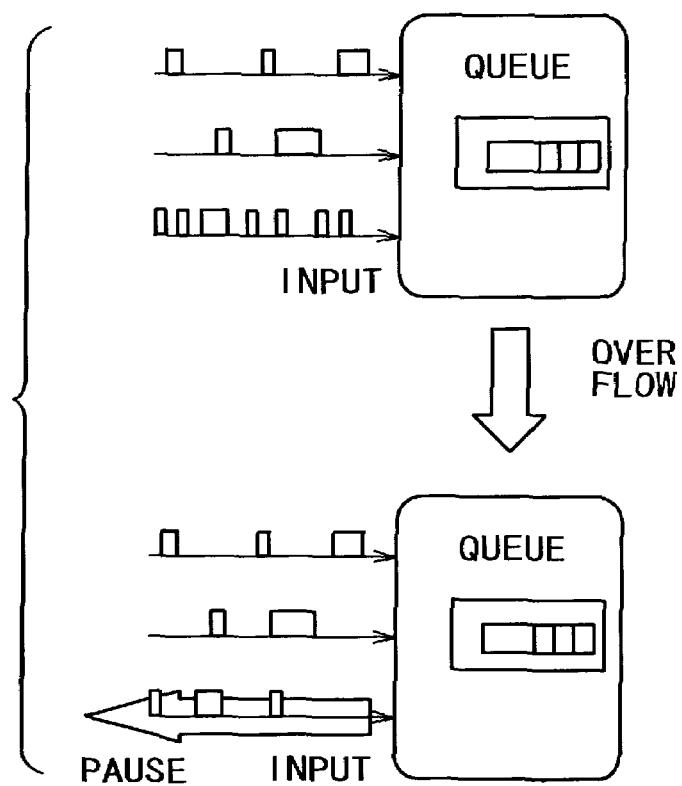

F I G. 1 2
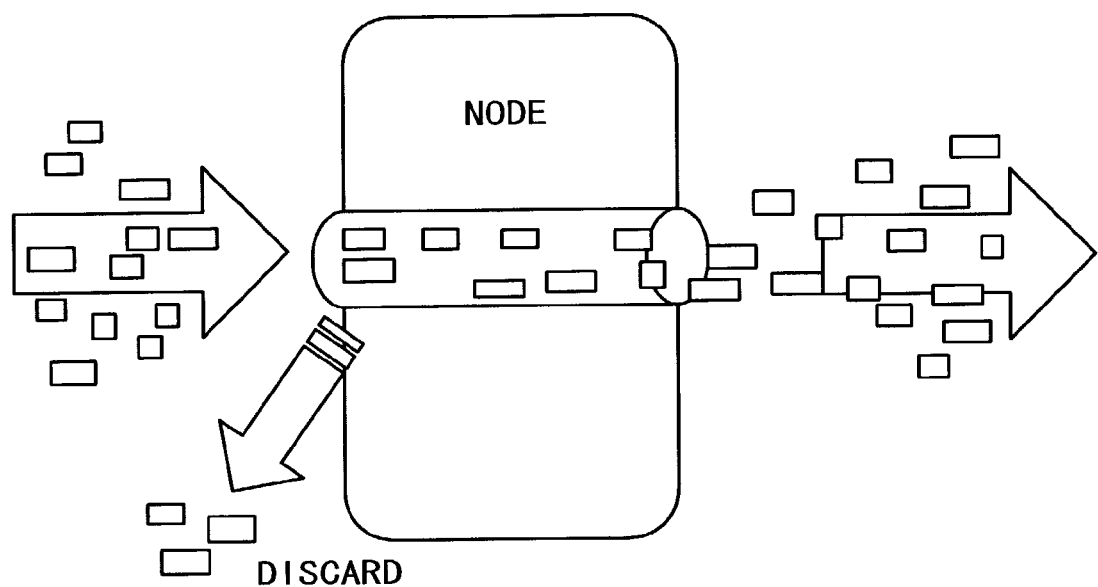
F I G. 1 3
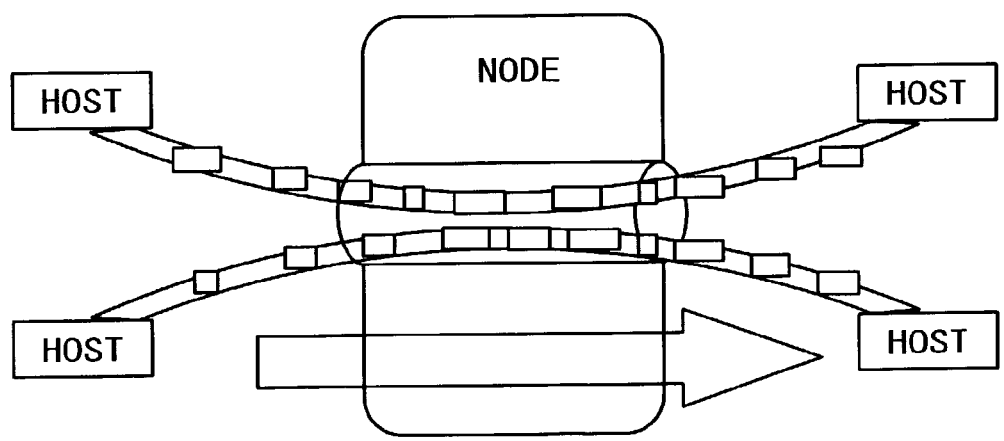

COMMUNICATION CONTROL METHOD AND NETWORK SYSTEM

BACKGROUND OF THE INVENTION

The present invention relates to a communication control method and a network system that are used for avoiding traffic congestions at a network node or the like.

In a network environment where the broadband communication has been becoming predominant, a variety of applications have emerged on the market. These applications have different qualities of required service depending on the purposes of the applications.

The applications include the one continuously required a high communication quality as is the case with an audio or moving-picture application. The number of such demands is expected to increase in the future where apparatuses at a home are connected to each other by a network for seamless communication with the Internet.

Technologies for assuring these communication qualities are collectively referred to as a Quality of Service (hereinafter referred to as "QoS") technology. As a QoS technology, there have been proposed a variety of techniques known in the prior art. Representatives of the QoS technologies include polishing/shaping, flow control, priority control and signaling.

Polishing is a technology by which a processing load applied by an apparatus receiving packets is reduced by discarding packets received after a prescribed number of receivable packets is exceeded.

Shaping is a technology often adopted in conjunction with the polishing technology. In the shaping technology, when apparatus transmits packets, packets to be processed are not transmitted instantly but are transmitted with consideration of time balance of the traffic. The concept of the shaping technology is shown in FIG. 10.

By adoption of the shaping technology, load balance in the media is smoothed, making it possible to avoid a situation in which much traffic occurred instantaneously.

In addition, the polishing/shaping technologies are capable of raising the resource-supplying efficiency of links for other communication apparatus existing in the network without requiring special implementations.

The flow-control is a technology for avoiding a congestion state of the network by transmission of a congestion signal to a traffic source to suppress the output of the traffic source when much traffic cause an overflow of an input buffer in an apparatus serving as a traffic destination as shown in FIG. 11.

By adoption of this technology, a packet can be prevented from being discarded by the polishing technology adopted on the reception side in a state of congestion. This technology is known as a back pressure in the half-duplex system. In a full-duplex system, on the other hand, this flow-control technology is defined by IEEE-802.3X specifications as a technique for transmitting a pause frame.

In addition, the flow-control technology is effective in that discard of packets by polishing technology can be avoided priorly.

The priority-control is a technology for transmitting certain traffic of packets in precedence of other traffic of packets after making priority comparison between them as shown in FIG. 12.

By adoption of the priority-control technology, data such as audio and moving-picture data can be transmitted at a high quality without turbulences. This technology is defined by IEEE-802.1p and DiffServ (RFC 2474) specifications. In addition, this technology is also generally referred to as a CoS (Class of Service) technology.

The priority-control technology is capable of providing a high-quality service by execution of control to give a high priority level to a specific piece of traffic in a range not exceeding the speed of the link.

The signaling technology is a technology for reserving a resource such as a band in advance for a route of traffic and not transmitting a packet prior to a stage at which the reservation is accepted as shown in FIG. 13. Since resources provided specially for the traffic are allocated for the transmission, the reliability of the transmission is very high. As long as a packet is transmitted in the range of reserved resources, there will be no state of traffic congestion and no packet will be discarded.

In addition, a request for a reservation of a resource for a traffic that seems to exceed the speed of the link is rejected. Thus, in traffic with a resource once reserved, the quality does not deteriorate due to disturbance.

In addition, since protection against worst delay is assured, this technology is suitable for real-time audio and moving-picture communications. Signaling protocols include RSVP (RFC 2205) and SBM (RFC 2814). In general, the QoS technology refers to this signaling technology.

However, the QoS technologies described above have the following problems.

First of all, in the case of the polishing technology, when polishing occurs, a discarded packet cannot be transmitted normally. For this reason, polishing should not be adopted in ideal communications.

In addition, in the case of the polishing/shaping technologies, all pieces of traffic are implemented in the best-effort type transmission. Thus, there is no means for avoiding a missing packet in the event of a traffic congestion.

Furthermore, in the case of the flow-control technology, it is necessary to implement the same flow-control mechanism on both the transmission and reception sides. Moreover, a uniform congestion control signal independent of the traffic type is transmitted so that best-effort data and stream data such as sounds and moving pictures are treated in the same way as an object of suppression. As a result, there is virtually no mechanism for protecting a piece of traffic with higher priority.

In addition, in the case of the priority-control technology, there is no means for discriminating and protecting a high-priority piece of traffic exceeding the speed of the link. Thus, such a high-priority piece of traffic brings about an adverse effect to all other high-priority pieces of traffic including a piece of traffic carried out normally. Furthermore, since there is no mechanism for suppressing a burst of traffic, a packet is possibly missed in a state of congestion.

Moreover, while the signaling technology has highest reliability among the QoS related technologies, this technology is not suitable for an environment in which a number of short traffic are generated. This is because a resource on a route of a traffic flow must be reserved.

In addition, since it is necessary to implement a uniform signaling protocol for all apparatus on the traffic route in order to assure the traffic completely, this technology has a lack of versatility. In the present state of the art, it is hard to say that the signaling protocol has become popular in a wide range of fields. Thus, there is raised a problem as to how to make the protocols uniform and how to implement the uniform protocol in a variety of apparatus.

SUMMARY OF THE INVENTION

It is thus an object of the present invention addressing the problems described above to provide a communication control method and a network system that realize a high communication quality even if packets including sounds and moving pictures are transmitted.

In order to achieve the object described above, in accordance with a first aspect of the present invention, there is provided a communication control method in a network in which at least 2 kinds of traffic, namely first traffic and second traffic, coexist. The communication control method is characterized in that the first traffic among pieces of traffic flowing into a first node is implemented, taking precedence of the second traffic, and flow control is executed on the second traffic.

Preferably, in a network in which at least 2 kinds of traffic coexist, the first traffic is implemented, taking precedence of the second traffic and flow control is executed on the second traffic. Thus, data such as audio and moving-picture data can be transmitted at a high quality without turbulences, and as a whole, states of congestion can be avoided.

Preferably, in network in which at least 2 nodes, namely, second and third nodes, exist on the downstream side of a first node, flow control is executed in accordance with a ratio of the amount of second traffic flowing from the second node to the first node to the amount of second traffic flowing from the third node to the first node. Thus, a packet of either traffic experiencing the flow control can be prevented from being discarded. In addition, by avoiding one-sided execution of the flow control, as a whole, high-quality communication can be implemented.

Preferably, the first traffic described above is traffic of packets each including a priority tag prescribed by IEEE-802.1p specifications, and the first traffic and the second traffic are distinguished from each other by determination of whether or not a priority tag exists. In this way, at a network node, it is possible to easily form a judgment as to whether or not traffic is to be given priority and traffic to experience flow control can be controlled quickly and with a high degree of reliability.

Preferably, the second traffic described above is best-effort traffic subjected to band control to put the second traffic always in a band with a bandwidth not exceeding a predetermined value. Thus, since the best-effort characteristic can be subjected properly to flow control, a burst can be avoided from the beginning even if a margin exists in a buffer so that the high-priority traffic can be protected with a high degree of reliability.

In accordance with a second aspect of the present invention, as a communication control system, there is provided a network system in which at least 2 kinds of traffic, namely, first traffic and second traffic, coexist. The network system comprises means for transmitting packets in the first traffic, taking precedence of the second traffic among pieces of traffic flowing into a first node and means for executing flow control on the second traffic.

As described above, in accordance with the present invention, in a network in which at least 2 kinds of traffic coexist, the first traffic is implemented, taking precedence of the second traffic and flow control is executed on the second traffic. Thus, data such as audio and moving-picture data can be transmitted at a high quality without turbulences, and as a whole, states of congestion can be avoided.

Preferably, in network wherein at least 2 nodes, namely, second and third nodes, exist on the downstream side of a first node, flow control is executed in accordance with a ratio of the amount of traffic flowing from the second node to the first node to the amount of traffic flowing from the third node to the first node. Thus, a packet of either traffic experiencing the flow control can be prevented from being discarded. In addition, by avoiding one-sided execution of the flow control, as a whole, high-quality communication can be implemented.

Preferably, the first traffic described above is traffic of packets each including a priority tag prescribed by IEEE-802.1p specifications, and there is provided means for distinguishing the first traffic and the second traffic from each other by determination of whether or not a priority tag exists. In this way, at a network node, it is possible to easily form a judgment as to whether or not traffic is to be given priority and traffic to experience flow control can be controlled quickly and with a high degree of reliability.

Preferably, the second traffic described above is best-effort traffic and there is provided means for executing band control to put the second traffic always in a band with a bandwidth not exceeding a predetermined value. Thus, since the best-effort characteristic can be subjected properly to flow control, a burst can be avoided from the beginning even if a margin exists in a buffer so that the high-priority traffic can be protected with a high degree of reliability.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a schematic diagram showing the configuration of a network, which is implemented by another embodiment of the present invention;

FIG. 10 is a conceptual diagram showing a conventional shaping technology;

FIG. 11 is a conceptual diagram showing a conventional flow-control technology;

FIG. 12 is a conceptual diagram showing a conventional priority-control technology; and FIG. 13 is a conceptual diagram showing a conventional signaling technology.

DETAILED DESCRIPTION OF THE PREFERRED EMBODIMENT

Figure 1:
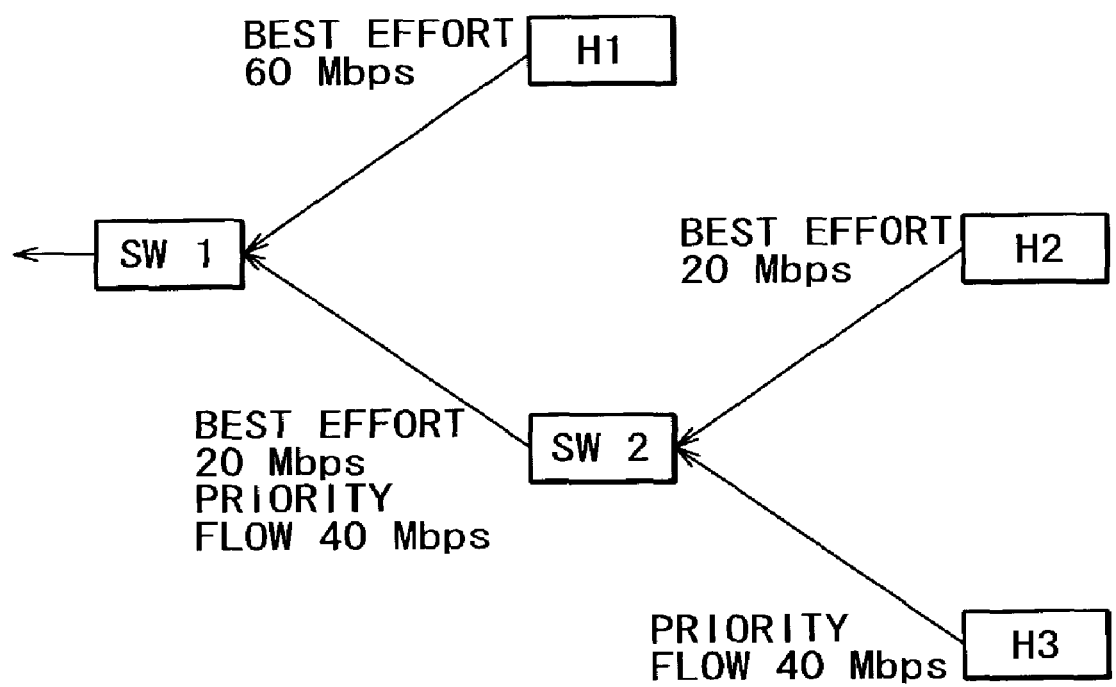
FIG. 1 is a schematic diagram showing the configuration of a network, which is implemented by an embodiment of the present invention.

Some preferred embodiments of the present invention are described by referring to the drawings.

Figure 2:
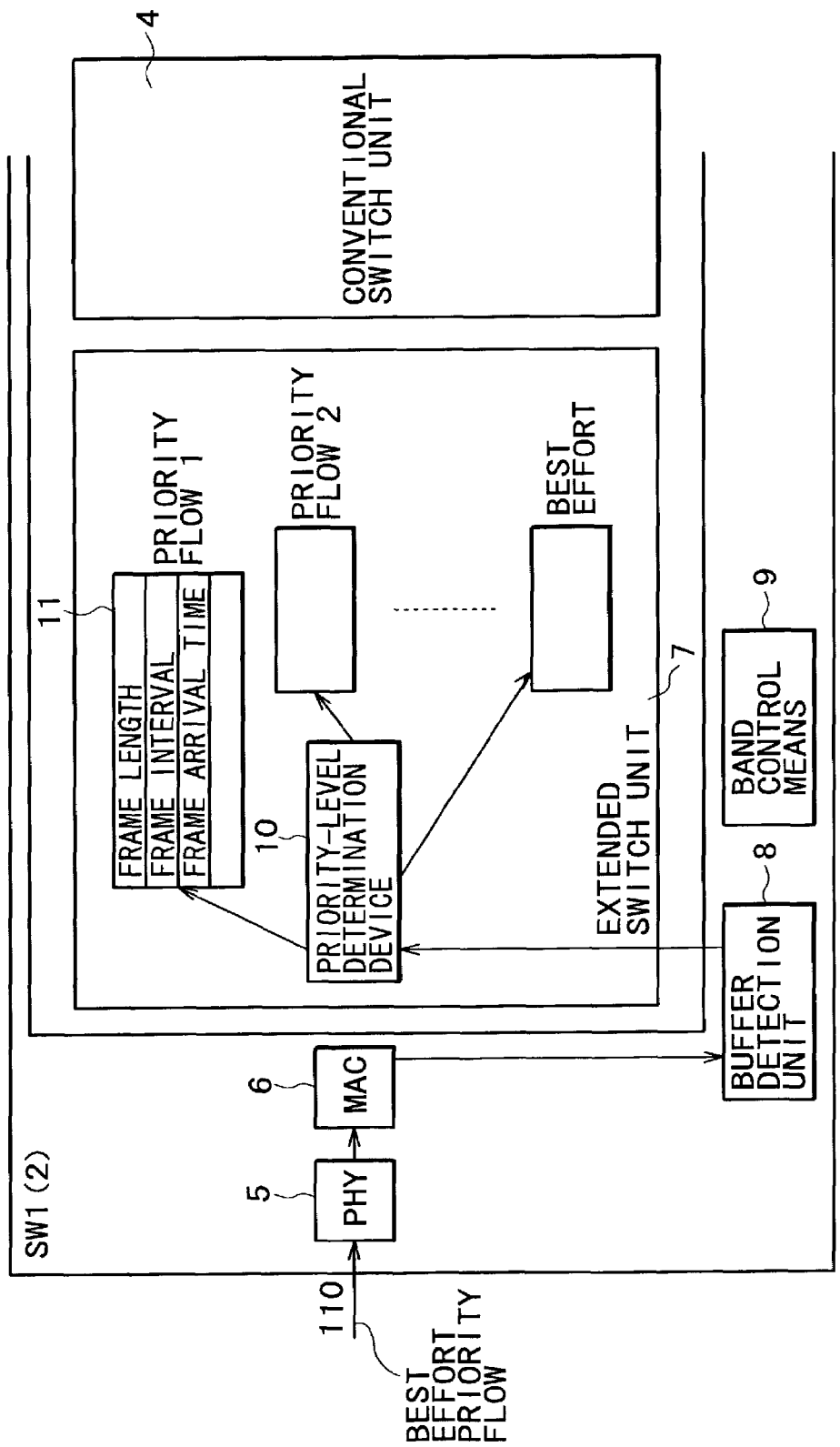
FIG. 2 is a schematic diagram showing second judgment hardware, which is provided by the embodiment of the present invention.

FIG. 1 is a block diagram showing the configuration of a network implemented by a first embodiment of the present invention. FIG. 2 is a block diagram showing the configuration of a node existing in the network.

It is to be noted that, while a technology conforming to the IEEE-802.3X specifications and a technology conforming to the IEEE-802.1p specifications are adopted in the embodiment described below as the flow-control technology and the priority-control technology respectively, technologies to be adopted in the embodiment are not limited to them.

As shown in FIG. 1, the network comprises nodes such as switches SW1 and SW2 as well as hosts H1, H2 and H3.

Traffic flows enter the switch SW1 from the host H1 and the switch SW2. On the other hand, traffic flows enter the switch SW2 from the hosts H2 and H3.

As shown in FIG. 2, the switch SW1 comprises the conventional switch unit 4, a PHY 5, a MAC 6, an additional extended switch unit 7, a buffer detection unit 8, and a band control means 9. A traffic flow from a communication route 110 is passed on by the PHY 5 to the extended switch unit 7 as a packet by way of the MAC 6.

The buffer detection unit 8 predicts occurrence of a congestion state in the network node by typically detecting the activity ratio of the buffer. The band control means 9 avoids a state of congestion by typically transmitting a pause frame.

The extended switch unit 7 can be implemented as a configuration independent of the conventional switch unit 4 or a configuration embedded in the conventional switch unit 4. In the case of the configuration having an architecture including separate buffers or separate queues each provided for each priority level, the extended switch unit 7 can be implemented as added to the buffers or the queues. It is to be noted that the buffers or the queues are not shown in the figure.

The extended switch unit 7 has a priority-level determination device 10 and registers 11. The priority-level determination device 10 serves as a second determination means. The registers 11 are provided for each priority level. If the priority-level determination device 10 executes priority control conforming to the IEEE-802.1p tags, for example, a priority level is determined from a priority tag fetched from the frame of a received packet. If the priority tag does not exist, the traffic is treated as best-effort traffic.

The data stored in the registers 11 typically includes a frame length, a frame interval, and a frame arrival time used for determining a priority level.

Figure 3:
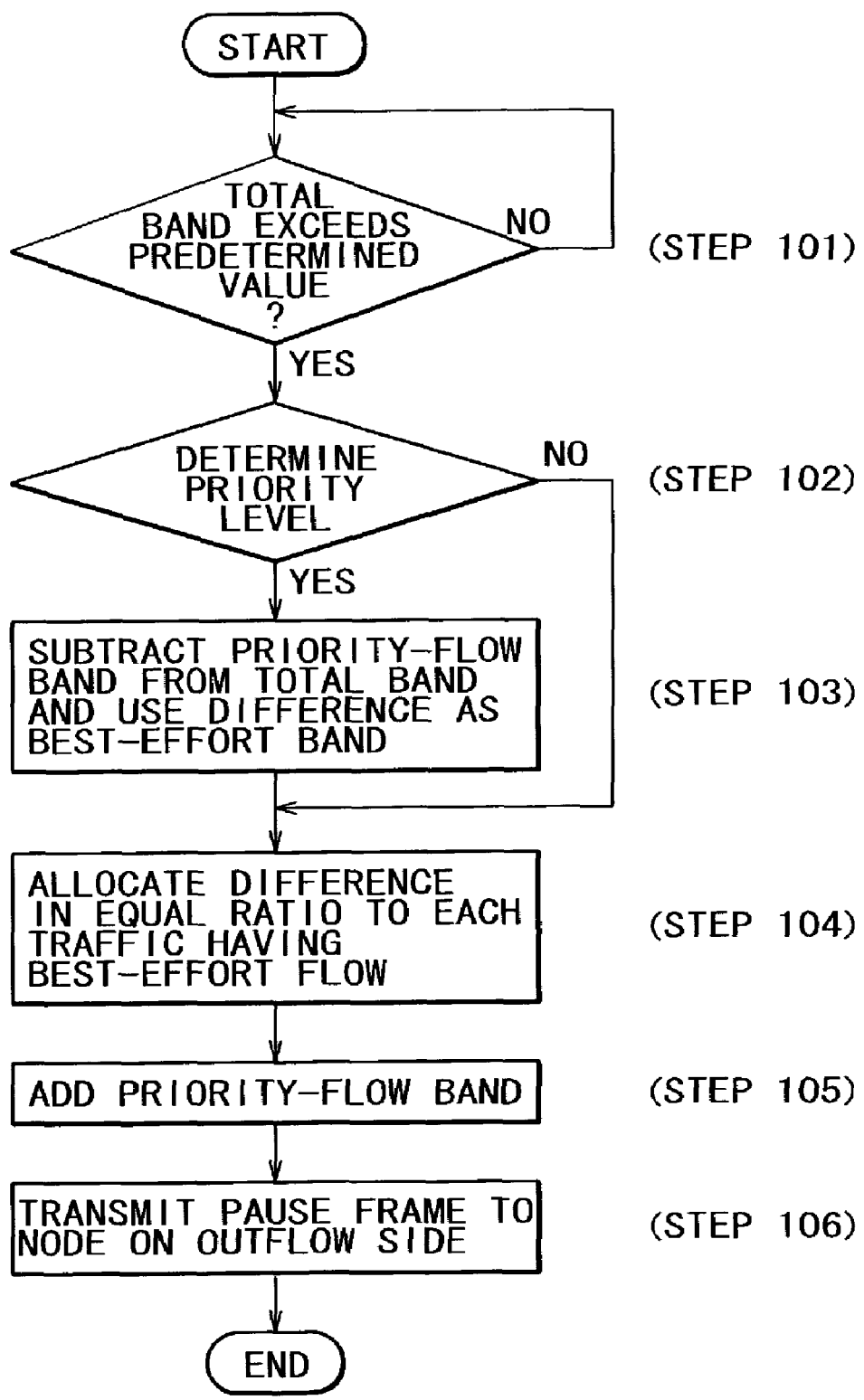
FIG. 3 is a flowchart representing a communication control method provided by the embodiment of the present invention.
Figure 4:
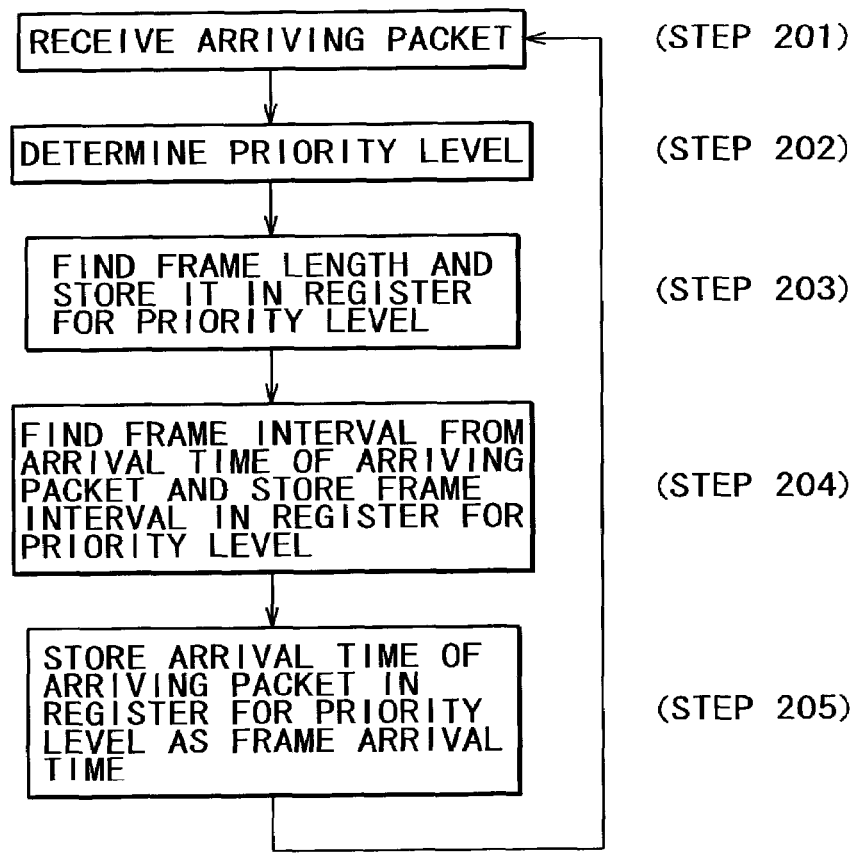
FIG. 4 is a flowchart representing operations to write data into registers provided by the embodiment of the present invention.
Figure 5:
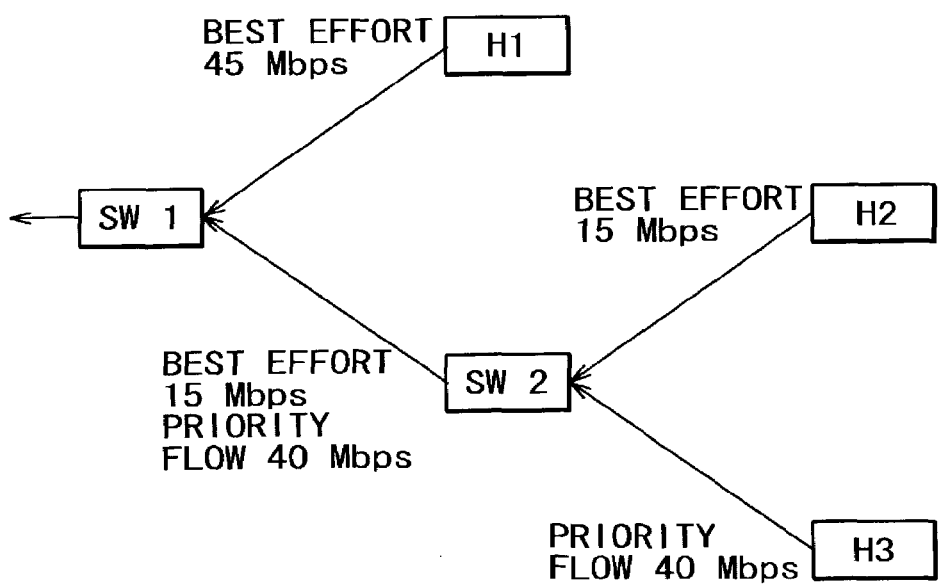
FIG. 5 is a conceptual diagram showing a network implementing congestion control according to the embodiment of the present invention.

Next, concrete operations of a communication control method are explained. FIG. 3 is a flowchart representing the communication control method, FIG. 4 is a flowchart representing operations to write data into the registers 11 and FIG. 5 is a conceptual diagram showing a network wherein congestion control is executed.

In the following description, the link speed of all communication routes is assumed to be 100 Mbps.

First of all, the flowchart shown in FIG. 3 begins with a step 101 to form a judgment as to whether or not a congestion is about to occur in the switch SW1 shown in FIG. 1 by determination of whether a total band of traffic flowing into the switch SW1 is greater than a predetermined value on the basis of data such as the contents of a counter and the activity ratio of the buffer.

If the outcome of the judgment shows that the total band of traffic is greater than the predetermined value, indicating that a congestion is about to occur, the flow of the control goes on to a step 102 at which the switch SW1 forms a judgment on a priority level, that is, a judgment as to whether or not a priority flow including IEEE-802.1p tags exists in the traffic coming from the switch SW2, and the switch SW1 also determines a ratio of occupation of the priority flow to the entire traffic coming from the switch SW2.

The flowchart shown in FIG. 4 begins with a step 201 at which, when a plurality of traffic flows including a priority flow and a best-effort traffic flow arrive at the switch SW2 from the communication route 110, in the switch SW2, the flows are passed as a packet on to the extended switch unit 7 by way of the PHY 5 and the MAC 6 as shown in FIG. 2.

The extended switch unit 7 finds an arrival time of the arriving packet and a frame length thereof.

Then, at the next step 202, the priority-level determination device 10 determines the priority level of the received packet. If an IEEE-802.1p tag is used in the priority control, for example, a priority level is determined by reading the priority tag existing in the frame of the received packet. If the priority tag does not exist, on the other hand, the packet is received as a best-effort packet.

Subsequently, at the next step 203, a frame length of the traffic with the priority level thereof determined is found by using a register 11 provided for the priority level and a new value is stored in the register 11.

In addition, by using a register 11 for the priority level, an interval between the arrival time of the immediately preceding packet and the arrival time of the current packet is computed as follows:

Frame interval=Packet arrival time−Frame arrival time in register

A new frame interval is then stored in the register 11 at the next step 204.

Subsequently, at the next step 205, a frame arrival time of the received packet is stored in a register 11 provided for the priority level to replace the previous frame arrival time.

The operations described above are carried out each time a packet arrives.

A traffic speed for each priority level is found by using the registers 11 for the priority level. For example, a traffic speed can be found by using the following equation.

Traffic speed (Wire speed)=Traffic frame length/ Frame interval×100 Mbps

In addition, a traffic speed can be found by using both hardware and software and can be stored in a register 11.

Then, the switch SW1 completing the formation of the judgment at the step 102 executes congestion control whereby a speed portion for the band of a priority flow is subtracted from the speed of the link, and the result of subtraction is used as a link speed for all traffic flows excluding the priority flow.

To be more specific, assume that the speed of the link is 100 Mbps and the speed portion for the band of a priority flow is 40 Mbps. In this case, the subtraction result of 60 Mbps is used as a best-effort link speed at the step 103. Then, at the next step 104, the link speed is allocated in equal ratio to each traffic flow. That is to say, the link speeds on the H1 and SW2 sides are 45 Mbps and 15 Mbps respectively.

Subsequently, at the next step 105, the band of the priority flow is added. Then, at the next step 106, pause frames are transmitted to the host H1 and the switch SW2 to provide link speeds of 45 Mbps and 55 Mbps on the H1 and SW2 sides respectively. In this way, the flow control is executed to avoid a state of congestion.

The traffic data rate's date_rate_new to be used as a new replacement of data_rate_old is found by using the following equation:

data_rate_new=data_rate_old (for a priority flow)

or $$data\_rate\_new = (link\_speed - Opriority\_flow\_rate) * data\_rate\_old/(Odata\_rate\_old - Opriority\_flow\_rate) \text{ (for best efforts)}$$

It is to be noted that the above congestion-control computation equations of the flow control are typical equations for executing priority-based congestion control. The allotment described above does not have to be based on these equations.

Then, the switch SW2 subjected to the congestion control described above has its traffic reduced from the original speed of 60 Mbps to a new speed of 55 Mbps so that the switch SW2 needs to apply similar congestion control to the hosts H2 and H3.

To put it in detail, a speed of 15 Mbps obtained as a result of subtracting a priority-flow speed of 40 Mbps from the actual-band speed of 55 Mbps is used as a best-effort link speed. Thus, flow control is executed to give 15 Mbps on the H2 side and 40 Mbps on the H3 side as shown in the traffic of FIG. 5.

The same algorithm can be applied to a network wherein terminal hosts are replaced by switches linked to each other in cascade connection. Also in this case, it is possible to execute proper flow control while protecting a priority flow.

As described above, in accordance with the embodiment, when the sum of a priority-flow band and a best-effort band exceeds a predetermined value, priority control is executed to let the priority flow takes precedence of others and flow control is executed to control the best-effort band. It is thus possible to transmit high-priority data such as sounds and moving pictures without turbulence at a high quality and to provide high reliable communication.

That is to say, in comparison with a case in which the flow control and the priority control are executed independently of each other, it is possible to avoid a state in which a priority flow is suppressed by a congestion control signal, and hence, sustain a high-quality communication.

The following description explains a second embodiment in which a best-effort band is a band not exceeding a predetermined value. It is to be noted that the explanation of the second embodiment's configuration elements and operations, which are identical with their counterparts in the first embodiment, is not repeated. That is to say, only differences between the first and second embodiments are explained.

In the case of the second embodiment, even if a margin exists in the buffer (or the queue) for priority traffic, a maximum traffic speed is set, and control is executed to prevent a traffic speed exceeding the set maximum traffic speed from being output.

In accordance with the second embodiment, for low-priority traffic such as best-effort traffic, at no time a band equal to or greater than a predetermined value is allocated. Thus, a burst can be prevented in advance, making it possible to realize a technique of protecting a priority flow.

In addition, a value of the maximum traffic speed is held by software or a register 11 for a priority level. Thus, the value can be set in accordance with a characteristic of the network and/or a policy established by the person in charge of system management by using hardware or software with a high degree of freedom.

It is to be noted that the scope of the present invention is not limited to the embodiments described above. That is to say, it is possible to make changes and modifications to the embodiments within a range of technological concepts of the present invention.

For example, in either of the embodiments described above, the switch SW1 does not specially employ different buffers for priority and best-effort flows.

However, it is also possible to design an architecture in which a buffer (or a queue) for a priority flow is provided separately from a buffer (or a queue) for a best-effort flow. In such an architecture, no congestion control is executed on the buffer (or the queue) for a priority flow. Instead, congestion control is executed only on the buffer (or the queue) for a best-effort flow in accordance with the degree of congestion in the buffer (or the queue) for a priority flow.

Also in this case, congestion control can be executed without controlling a priority flow.

In addition, in the embodiments described above, the host H3 generates only traffic of priority flows. However, the embodiments are not limited to this scheme. As shown in FIG. 6, it is also possible to conceive a case in which a host such as the host H3 generates several pieces of traffic having priority levels different from each other. Examples of such pieces of traffic are a priority flow and a best-effort flow.

Figure 7:
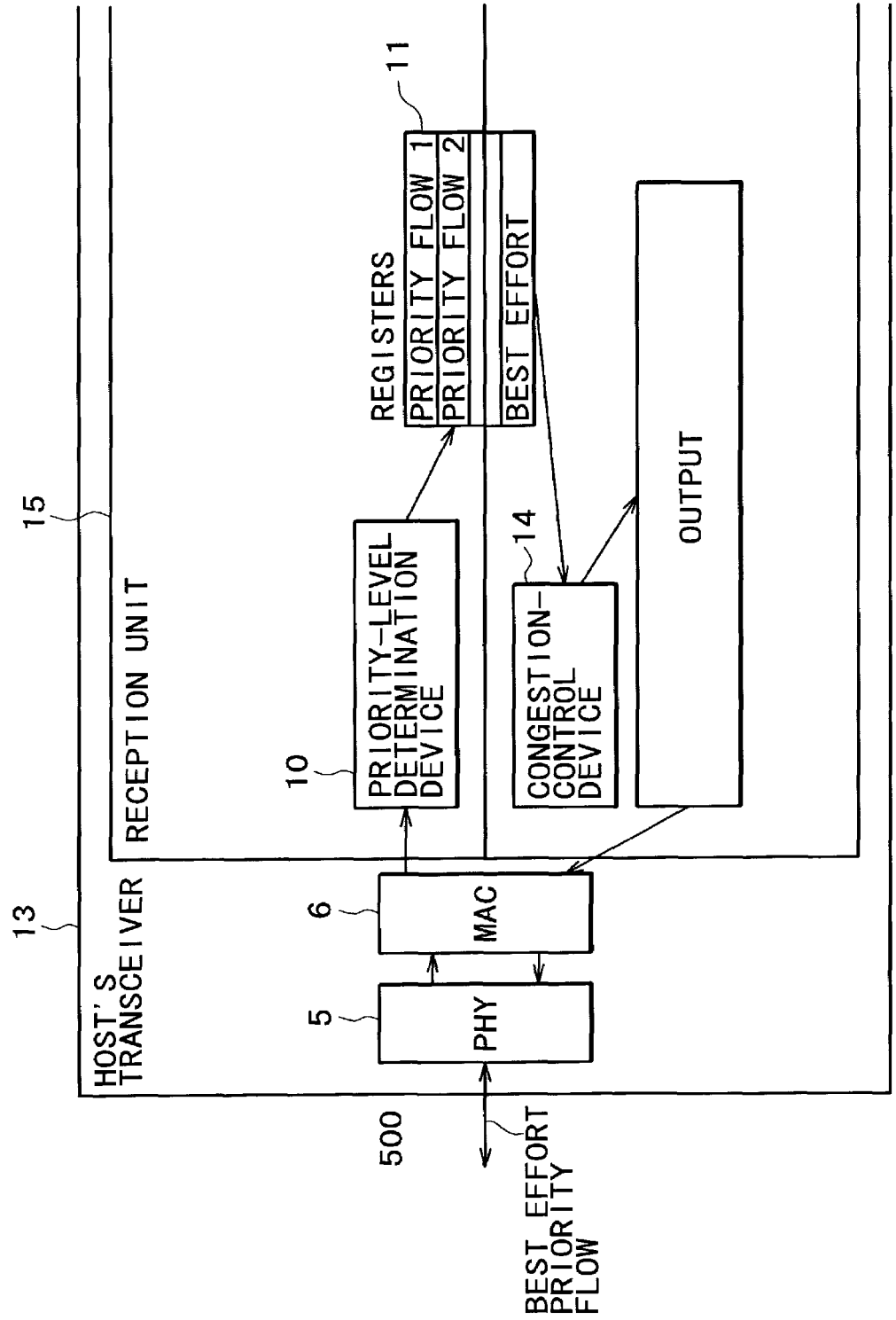
FIG. 7 is a schematic diagram showing hardware, which is used for determining traffic to be subjected to congestion control executed by a host provided by another embodiment of the present invention.

FIG. 7 is a diagram showing such a host's typical configuration for identifying traffic to be subjected to congestion control.

As shown in the figure, the configuration includes a priority-level determination device 10, registers 11 and a congestion-control device 14 in addition to a transceiver 13 of an ordinary host. It is to be noted that the priority-level determination device 10 can be implemented as a configuration independent of a reception unit 15 or a configuration embedded in the reception unit 15. In addition, in an architecture wherein buffers (or queues) are provided separately for different priority levels, the congestion-control device 14 can be implemented as a configuration added to the buffers (queues), which are not shown in the figure.

In the transceiver 13 of the host, the priority-level determination device 10 identifies traffic specified by a congestion-control signal received from a transmission line 500. The priority-level determination device 10 stores information on the identified traffic to be subjected to congestion control in a register 11. The congestion-control device 14 then executes the congestion control on the traffic which has been stored in the register 11. It is to be noted that the congestion control can also be executed even if there are several pieces of traffic.

To put it concretely, the switch SW2 is capable of executing congestion control on low-priority traffic such as a best-effort flow from the host H3 as shown in FIG. 6. The switch SW2 under the congestion control applies the congestion control to the hosts H2 and H3 to reduce the traffic speed from the original value of 80 Mbps to 64 Mbps in the same way as the embodiment described above.

Thus, a speed of 24 Mbps obtained as a result of subtracting the priority flow's speed of 40 Mbps from an actual band of 64 Mbps is used as a link speed for a best-effort flow.

The flow control is executed to split 24-Mbps speed into a speed of 12 Mbps allocated to the host H2 and a speed of 12 Mbps allocated to the host H3 to provide a total speed of 52 Mbps if added to the priority flow's speed of 40 Mbps.

Figure 8:
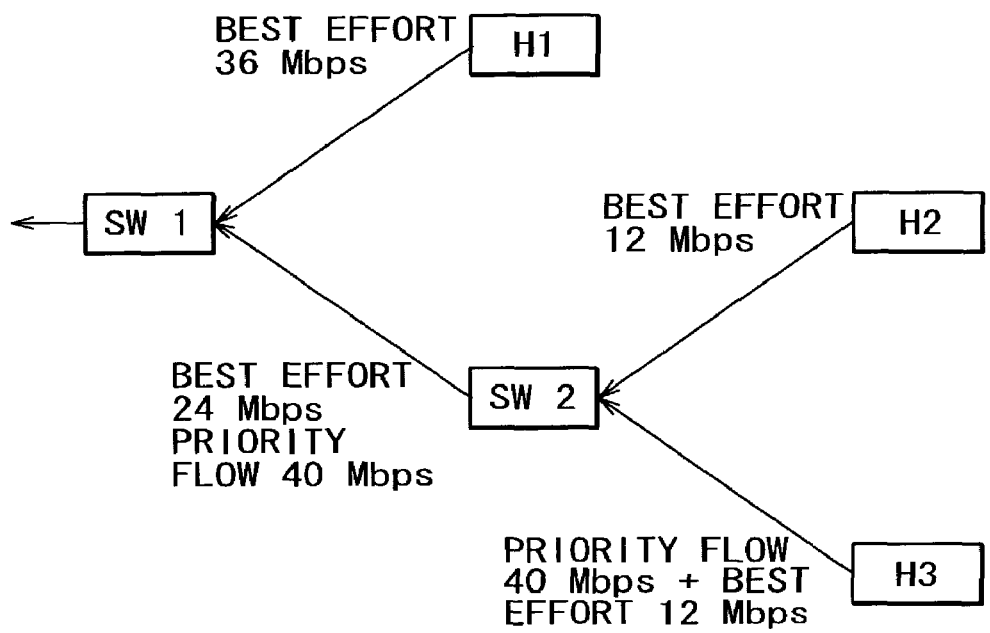
FIG. 8 is a conceptual diagram showing a network implementing congestion control according to another embodiment of the present invention.

Thus, the host H3 executes congestion control only on traffic specified by a congestion-control signal received from the switch SW2. Accordingly, the host H3 executes congestion control specified by the switch SW2 as shown in FIG. 8, making it possible to realize a proper flow-control function to allocate a speed of 12 Mbps only to a best-effort flow.

In the network implemented by the embodiment described above as shown in FIG. 1, the switch SW2 is subjected to priority-based congestion control. Even if the switch SW2 is not subjected to priority-based congestion control, by monitoring the rate of a priority flow from the switch SW2 experiencing flow control, it is possible to determine that the switch SW2 is not subjected to priority-based congestion control. Thus, if the switch SW2 is determined to be in status of being not subjected to priority-based congestion control, it is possible to carry out processing that conforms to the result of determination.

If it is desired to know beforehand whether or not an adjacent apparatus is subjected to priority-based congestion control, the adjacent apparatus can be examined deliberately by executing another protocol.

As a protocol, an auto negotiation function can be carried out.

Figure 9:
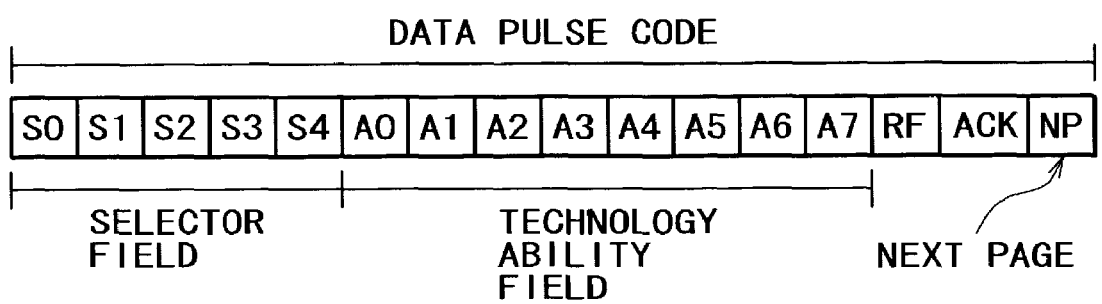
FIG. 9 is a conceptual diagram showing data pulses of auto negotiation according to another embodiment of the present invention.

To put it concretely, for formation of a judgment as to whether or not an adjacent apparatus is subjected to priority-based congestion control, the adjacent apparatus can be examined by adopting a next-page protocol using a next page (NP), which is a functional extension portion existing as a data pulse of an auto negotiation as shown in FIG. 9.

In addition, even if an adjacent apparatus is not subjected to priority-based congestion control, it is possible to determine by auto negotiation whether or not the apparatus conforms to 802.3x specifications provided that a technology conforming to the 802.3x specifications is adopted as a flow-control technology.

Thus, since it is no longer necessary to make a change to the policy of the congestion control according to a feedback obtained as a result of the priority-based congestion control, a more efficient operation can be expected.

To put it concretely, if the switch SW2 is not subjected to priority-based congestion control, the switch SW1 itself does not execute the priority-based congestion control, but executes only the normal flow control.

As an alternative, there is also a conceivable measure of allocating a band to a priority flow by raising the size of an effective band allocated to the switch SW2. The sizes of the bands can then be changed dynamically in accordance with the characteristic of the network and/or a policy set forth by a person in charge of system management.

If a band is allocated to a priority flow by increasing the size of an effective band allocated to the switch SW2, however, care needs to be exercised since the effective band is not distributed uniformly even in the case of the same best-effort communication.

In addition, even in a case where a flow control is not capable of specifying traffic subjected to congestion control as is the case with a protocol conforming to the IEEE-802.3x specifications, a proper flow control can be realized by implementing another protocol.

For example, traffic to be subjected to congestion control is specified by appending a 802.1p priority tag following a pause packet conforming to the IEEE-802.3x specifications.

By appending such a 802.1p priority tag, a host receiving the specification of traffic to be subjected to congestion control is capable of identifying traffic to be subjected to congestion control from the priority-control portion and of protecting traffic to be given high priority.

In addition, even if another protocol is not implemented, the priority level of currently flowing traffic is held by using for example software or hardware (or a register) on the host side so that the host is capable of identifying traffic with a lowest priority level in execution of congestion control. Proper flow control can then be implemented by halting such traffic.

As a result, even if a separate protocol is not implemented, priority traffic is not suppressed by a congestion-control signal so that a high-quality communication can be maintained.

In accordance with the present invention described above, it is possible to provide highly reliable communication by combination of congestion avoidance by flow control with priority control based on priority adjustment.

That is to say, the present invention offers the following conceivable merits in comparison with a case in which flow control and priority control are executed independently of each other.

It is possible to avoid a state in which priority traffic is suppressed by a congestion-control signal and maintain a high-quality communication. In addition, even if an apparatus not implementing the present invention is connected, traffic can be controlled effectively as long as neither routers nor switches are linked in a cascade connection on the input-port side.

In addition, no special implementation is required for a general AV terminal (host), and even if an apparatus is linked in a cascade connection, the apparatus can be operated to execute functions thereof effectively without requiring a special protocol in communications with other apparatus.

Furthermore, even if an apparatus not implementing the present invention is linked in a cascade connection on the input-port side, performance as an ordinary router or an ordinary switch can be exhibited.

Moreover, since the present invention provides a network system capable of coexisting with the conventional apparatus, it is possible to migrate from the conventional system to the network without doing anything, and even in the case of a terminal (or a host) allowing a plurality of traffic flows to pass through, functions can be executed effectively by a simple implementation on the terminal side.

Thus, by virtue of these effects, it is possible to implement communication with a small implementation load but higher reliability in comparison with the conventional one.

While a preferred embodiment of the present invention has been described using specific terms, such description is for illustrative purposes only, and it is to be understood that changes and variations may be made without departing from the spirit or scope of the following claims.

What is claimed is:

1. A communication control method in a network said method comprising the steps of:

transmitting said first traffic and second traffic to a first node, wherein the first traffic comprise a priority tag;

determining whether a combined traffic flow exceeds a predetermined bandwidth level indicating congestion;

executing a first type of flow control on said second traffic when the combined traffic flow is determined to exceed the predetermined bandwidth level; and executing a second type of flow control when the combined traffic flow is determined not to exceed the predetermined bandwidth level, wherein the first type of flow control comprises:

distinguishing said first traffic from said second traffic as a function of the priority tag;

assigning first traffic a predetermined speed portion of the predetermined bandwidth level;

assigning the second traffic to a remaining speed portion of the predetermined bandwidth level;

limiting second traffic flowing through a second node to the first node from one or more third nodes to a limited speed portion, wherein the limited speed portion is calculated as a function of (1) the remaining speed portion, (2) second traffic from a fourth node flowing to the first node, and (3) second traffic flowing through second node from one or more third nodes; and wherein the second type of flowing control, which is executed when the combined traffic flow is determined not to exceed the predetermined bandwidth level, comprises:

setting a maximum speed portion for second traffic;

preventing a burst of speed traffic from disrupting transmission of first traffic.

2. A network system having first traffic and speed traffic coexist, said network system comprising:

transmitting means for transmitting first traffic and second traffic to a first node, wherein the first traffic comprises a priority tag;

determining means for determining whether a combined traffic flow exceed a predetermined bandwidth level;

flow control executing means for executing a first type of flow control when the combined traffic flow determined to exceed the predetermined bandwidth level; and for executing a second type of flow control when the combined traffic flow is determining not to exceed the predetermined bandwidth level;

wherein the first type of flow control comprises:

distinguishing said first traffic from said second traffic as a function of the priority tag;

assigning first traffic a predetermined speed portion of the predetermined bandwidth level;

assigning the second traffic to a remaining speed portion of the predetermined bandwidth level;

limiting second traffic flowing through a second node to the first node from one or more third nodes to a limited speed portion which is calculated as a function of (1) the remaining speed portion, (2) second traffic from a fourth node flowing to the first node, and (3) second traffic flowing through second node from one or more third nodes; and wherein the second type of flow control, which is executed when the combined traffic flow is determined not to exceed the predetermined bandwidth level, comprises:

setting a maximum speed portion for second traffic;

preventing a burst of speed traffic from disrupting transmission of first traffic.

* * * * *

UNITED STATES PATENT AND TRADEMARK OFFICE
CERTIFICATE OF CORRECTION

| | | |
|---|---|---|
| PATENT NO. | : 7,630,303 B2 | Page 1 of 1 |
| APPLICATION NO. | : 10/266473 | |
| DATED | : December 8, 2009 | |
| INVENTOR(S) | : Masunaga et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Second Day of November, 2010

David J. Kappos
*Director of the United States Patent and Trademark Office*